June 1, 1937.　　　F. G. NESBITT　　　2,081,950
TEMPERATURE PRESSURE ALTIMETER
Filed April 10, 1933.　　　2 Sheets-Sheet 1
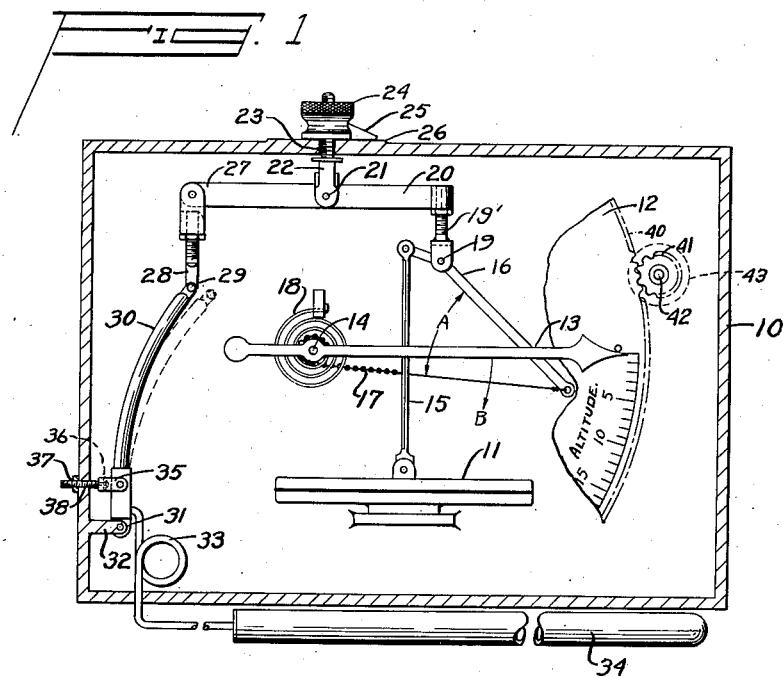
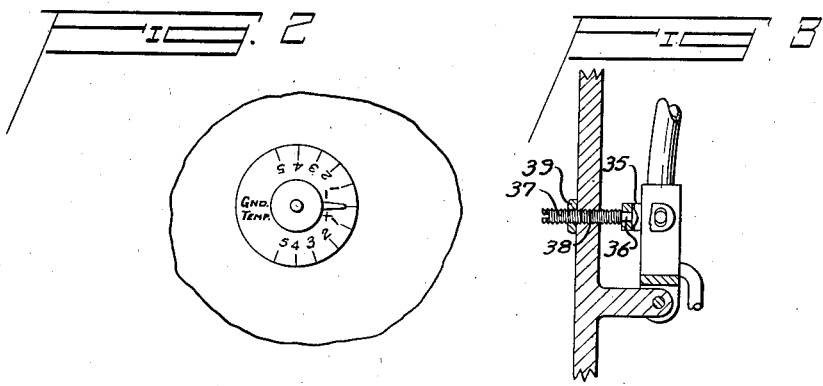
INVENTOR
FRANCIS G. NESBITT
BY
ATTORNEYS

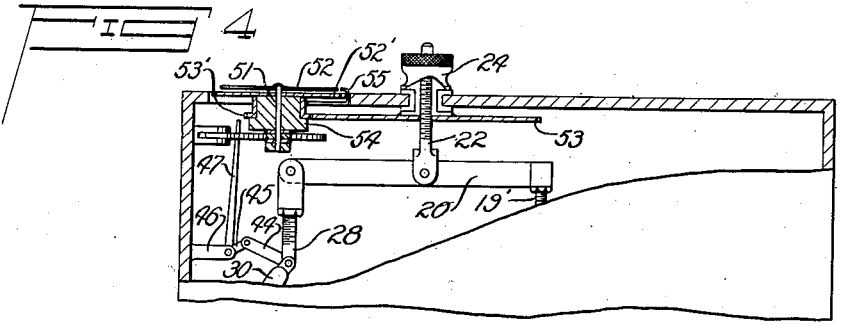
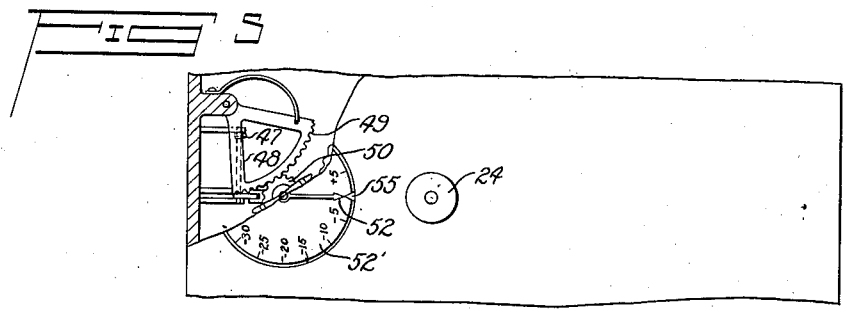
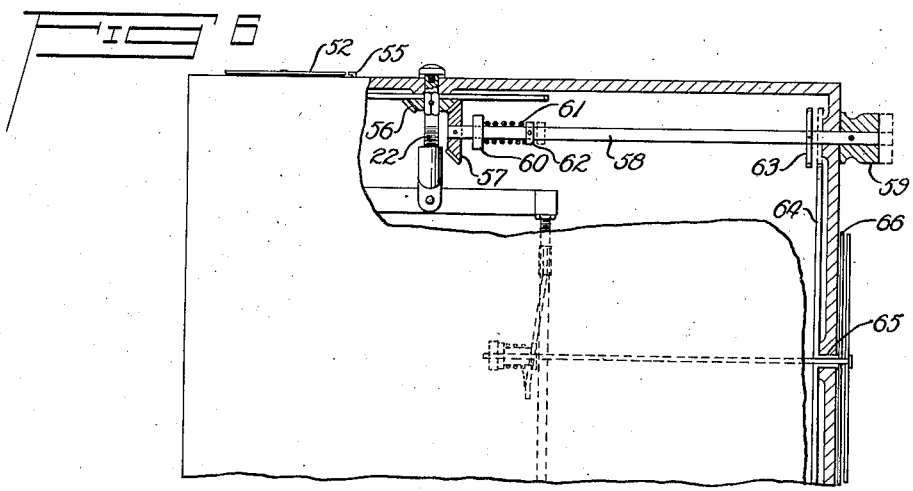

Patented June 1, 1937

2,081,950

UNITED STATES PATENT OFFICE 2,081,950

TEMPERATURE-PRESSURE ALTIMETER

Francis G. Nesbitt, Dayton, Ohio

Application April 10, 1933, Serial No. 665,393
18 Claims. (Cl. 73—4)

(Granted under the act of March 3, 1883, as
amended April 30, 1928; 370 O. G. 757)

The invention described herein may be manufactured and used by or for the Government for governmental purposes, without the payment to me of any royalty thereon.

The present invention relates generally to pressure indicating instruments or altimeters for measuring the atmospheric pressure or the height above the earth by means of atmospheric pressure.

In altimeters of conventional design, altitude is usually obtained through the use of an aneroid capsule or evacuated diaphragm box connected to a pointer movable over a scale by means of a suitable motion amplifying linkage. In instruments of this general character, certain errors occur by reason of the change in temperature to which the instrument is subjected when aloft. Instrument errors of this nature are usually compensated for by providing one or more bimetallic compensating elements in the motion amplifying linkage to correct in part the reading of the pointer on its scale. However, in conventional instruments, no means has been provided for compensating for the variations which occur in temperature at the ground level and aloft and as a result the indicated altitude in instruments of conventional design is in error, except when the actual temperature conditions coincide exactly with those assumed in the calibration standard.

Assume, for instance, that the conventional altimeter is one which is mechanically perfect. the average ground temperature assumed in the calibration standard is +15° C. It is further assumed in the calibration standard most generally used that for every thousand foot increase in altitude, the temperature decreases substantially 2° C. If we assume that this condition actually exists as stated, it will be apparent that when the true altitude is ten thousand feet and if the temperature would be —5° C., the pointer on the scale of the mechanically perfect instrument would read ten thousand feet.

Suppose, however, that the same mechanically perfect instrument is to be used at a different hour or on a different day and that the ground temperature at that time is +30° C. instead of +15° C. and the instrument is taken aloft to the ten thousand foot level, the temperature aloft would then be +10° C. according to the standard assumed lapse rate. This difference in temperature would react on the instrument in such a manner that instead of obtaining a true altitude reading of ten thousand feet, the actual indicated altitude would be between nine thousand and ten thousand feet, or in other words, the instrument would be reading low.

In a like manner, when the ground temperature is, say 0° C. on a still different day, it would be found that at ten thousand feet actual altitude, the temperature would be —20° C., according to the standard assumed lapsed rate. Under these conditions, a mechanically perfect instrument would read high, that is, the altitude indicated by the instrument would be greater than the true altitude.

In the two cases just described, the standard assumed temperature lapsed rate of approximately two degrees centigrade decrease with every increase of a thousand foot altitude was considered to be correct. In actual practice, however, the conditions just mentioned would be only a coincidence. For example, a reasonable ground temperature may be +30° C. instead of the standard perature assumed +15° C. and a reasonable temperature at ten thousand feet at the same time may be —12° C. instead of the standard assumed —5° C. It is obvious that the assumption of an average lapse rate for accurate determination of altitude by measuring the change in atmospheric pressure is definitely unreliable. This fact is consistent with the general understanding of the serious disadvantages of the conventional pressure type altimeters. An altimeter deriving its indication by the measurement of pressure only cannot be correctly calibrated in terms of altitude unless the temperature conditions are assumed.

The primary object, therefore, of the present invention is to provide a temperature-pressure altimeter, or one in which both temperature and pressure are utilized in the operation of the altimeter so that the altitude indicated as the result thereof is derived directly from the actual conditions of both temperature and pressure.

A further object of the present invention is to provide in an altimeter of this character temperature sensitive means adapted to cooperate with the motion amplifying linkage in a manner such that the multiplication ratio of the linkage is automatically and continuously derived from the existing atmospheric pressure and the mean of the existing ground temperature and the existing free air temperature aloft.

A still further object of the present invention is to provide in an instrument of this character a manually and/or mechanically operated ground temperature setting means obtaining its temperature measurements from a free-air thermometer element while the instrument is at the ground temperature and which is capable of being locked in this position either manually or in conjunction with a zero setting system of the altimeter.

A still further object of the present invention is to provide in an instrument of this character a temperature sensitive means responsive to any variation of free air temperature aloft which cooperates with a ground temperature setting device in a manner such that the amplification ratio of the multiplying linkage is automatically controlled in a pre-determined manner with respect to the average of the ground temperature and any existing free air temperature aloft.

A still further object of the present invention is to provide in an instrument of this character means for relatively adjusting the flexible unit of the thermometer element with respect to the ground temperature setting means and the amplification linkage for purposes of calibration.

Other more specific objects of my invention will appear from the description hereinafter set forth and the features of novelty will be pointed out in the appended claims.

In the accompanying drawings, for purposes of illustration and description, I have shown an example of my invention embodied in an aneroid or altimeter, my improved construction being particularly adapted to this type of measuring instrument.

In the accompanying drawings, Fig. 1 is a diagrammatic view of one embodiment of my invention.

Fig. 2 is a partial detail view of the ground temperature setting device and ground temperature scale.

Fig. 3 is an enlarged sectional detail view of the calibrating device used in connection with the flexible unit of the thermometer element.

Fig. 4 is a partial detail view of a modification of the ground temperature setting device shown in Fig. 1.

Fig. 5 is a top plan view of Fig. 4 with the casing partially broken away to illustrate the operating mechanism.

Fig. 6 is a still further modification of the ground temperature setting device shown in Figs. 4 and 5.

Referring more particularly to the drawings, wherein corresponding parts are designated by like numbers throughout the several views, the instrument in one embodiment of my invention herein illustrated comprises generally a casing 10, within which is fixedly supported an aneroid disc 11, hereinafter referred to as a pressure responsive element. The casing 10 has mounted thereon a dial scale 12 over which a pointer 13 pivotally mounted on a pointer shaft 14 carried within the casing 10 is adapted to operate. This pointer is actuated through the medium of a motion amplifying linkage which includes a primary bimetallic link 15 pivotally connected at its one end to the pressure responsive element 11. A secondary link 16 is pivotally secured to the upper end of the primary link 15, the free end of the former being connected to the pointer 13 by means of a flexible chain connection 17, as shown in Fig. 1. A coiled spring 18 having its inner end connected to the pointer shaft 14 and its outer end fixedly secured to a support in the casing tends to normally maintain the pointer in registry with the zero indication on the scale 12. The foregoing description relates generally to that of a conventional pressure altimeter.

The secondary link 16 pivots as at 19 on a clevis 19' adjustably mounted in the one end of a link connection 20, the latter forming an adjustable carrying member for the link 16. The link connection 20 is pivoted intermediate its ends as indicated by numeral 21 to a supporting clevis 22, threaded at its outer end portion, which portion is adapted to be inserted through an opening 23 provided in the top of the casing 10. A manually adjustable hand knob 24 provided with a central threaded portion is adapted to be screwed upon the threaded portion of the supporting clevis 22, as shown in Fig. 1. This hand knob is provided with an index 25 which is angularly movable over a scale 26 positioned exteriorly of the casing 10, as shown in Fig. 1. This scale bears calibrations in units of ground temperature.

The outer end of the link connection 20 indicated by the numeral 27 has pivoted thereto an adjustable link 28, the lower end of which is pivotally connected, as indicated by numeral 29, to the upper end of a flexible temperature responsive element such as a Bourdon tube spring indicated by numeral 30. This Bourdon tube spring is pivotally mounted at its lower end 31 to an inwardly extending flange 32 formed in the casing 10. The lower end of the Bourdon tube spring has connected thereto a flexible connection 33, formed of tubular material, which connects remotely with a free air thermometer bulb element of the distant type indicated by numeral 34. A U shaped spanning member 35 pivotally mounted at its one end to the Bourdon tube spring in the manner illustrated in Fig. 3 is provided at its closed end with a circular opening 36, forming a bearing within which is rotatably mounted the inner end of an adjusting screw 37, the outer end of the adjusting screw being adapted for screw threaded engagement in a threaded opening 38, formed in the side of the casing 10. A lock nut 39 is screwed upon the outer end of the adjusting member, which is for the purpose of locking this member in different positions of adjustment with respect to the casing 10 and effect different angular settings of the Bourdon tube spring with respect to the linkage heretofore described.

By referring to Fig. 1, it will be noted that the periphery of the dial scale 12 is formed with gear teeth 40 adapted for meshing engagement with the gear teeth of a pinion 41, which is fixed on a shaft 42, rotatably mounted in the casing 10, which shaft carries at its outer end a hand knob indicated by numeral 43, the purpose of which is to provide a ready means for effecting a relative adjustment between the dial scale 12 and pointer 13 to adjust the setting of the pointer with respect to the zero indication of the scale on the dial 12.

The operation of the device thus far is as follows: When the instrument is carried aloft in an airplane, to indicate the height of the airplane above the ground the index 25 is first moved over its scale to a temperature indication corresponding with the existing ground temperature. Rotation of the hand knob 24 either clockwise or counter-clockwise will effect a simultaneous lowering or raising of the supporting member 22, which in turn will cause the inner end of the link connection 20 to be lowered or raised, carrying with it the secondary link 16. By observing Fig. 1, it will be apparent that normally the free end of the secondary link 16 is so positioned with respect to the chain connection 17 such that an angle "A" is formed therebetween. If, however, the hand knob 24 is rotated to cause the inner end of the link connection 20 to be raised upwardly, the angle between the secondary link 16 and chain connection 17 will be decreased, which will automatically effect a change in the amplification ratio of the multiplying linkage. On the other hand, if the hand knob 24 is rotated in the opposite direction, the link connection 20 will be lowered and the secondary link 16 will be moved downwardly and the angle between this link and the chain connection will be increased effecting a change in the amplification ratio of the multiplying linkage in a manner opposite to that heretofore described. At the same time it will be apparent that in setting the instrument for any existing ground temperature condition, a micrometric adjustment of the pointer over its scale will take place. Consequently, after each setting of the instrument for existing ground temperature conditions, it is necessary to adjust the scale by means of the hand knob 43 to bring the zero setting of the scale and the pointer into registry.

As is well known to those skilled in the art, in ascending, the air pressure on the outside of the aneroid disc decreases and under these conditions the aneroid will begin to expand and through the medium of the multiplying linkage the pointer 13 will be moved downwardly as shown by the arrow B. It is to be understood that the free air thermometer element is of a type containing any suitable fluid such as air or mercury, or other liquids readily expansible or contractible by changes in temperature, which fluids are placed within the thermometer element and sealed therein under a pressure sufficient to partially straighten the Bourdon tube spring in the manner shown in the full line position in Fig. 1. Consequently, as the air temperature decreases in ascending, the volume and/or pressure of the liquid or fluid in the thermometer element in decreasing will permit the Bourdon tube spring to deflect to the normal position shown in dotted line as illustrated in Fig. 1. This, in turn, will move the inner end of the link connection 20 upwardly and effect an instantaneous and continuous change in the ratio of the motion amplifying linkage to compensate for variations in free air temperature. At the same time the upward movement of the link 20 will impart a rotational movement to the pointer over its scale in the same or an opposite direction as that movement imparted the pointer when the aneroid disc responds to changes in atmospheric pressure. It is to be understood that the direction of movement imparted the pointer 13, as the result of temperature changes, depends entirely upon the relation existing between temperature conditions and atmospheric pressure conditions when the instrument is in use. By means of the arrangement set forth above, it will be readily understood that the indicated altitude will be a true indication of the altitude to which the instrument is carried based upon the atmospheric temperature and atmospheric pressure existing at that time.

Figs. 4 and 5 illustrate a further modification of the ground temperature setting device mentioned heretofore. By observing Fig. 4 it will be noted that the upper free end of the Bourdon tube spring has pivotally connected thereto a link 44, the free end of which is adapted to actuate a bell crank lever 45, which pivots on an inwardly extending flange 46 provided in the casing 10. The longer arm of this bell crank lever indicated by numeral 47 is adapted to bear against a cam shaped portion 48 formed on the geared sector 49 which is pivotally mounted to the casing 10, as shown in Fig. 5. This gear sector, as will be noted by referring to Fig. 4, is in meshing engagement with a pinion 50 mounted on a shaft 51, which rotates within a bearing portion provided in a support 54 formed in the upper end of the casing 10. A pointer 52 is carried upon the upper end of the shaft heretofore mentioned and operates over a scale 52' calibrated in units of ground temperature. In this modification it will be noted that the hand knob 24, heretofore described, carries a gear 53, which meshes with a pinion 53' rotatably mounted upon the support 54. This pinion carries an index 55 which is relatively rotatable with respect to the scale 52' heretofore mentioned. By means of this construction it will be readily understood that as the Bourdon tube spring responds to changes in temperature an indication of the actual temperature will be obtained on the scale 52'. Consequently, when it is desired to adjust the linkage of the instrument to the ground temperature then existing, this same may be accomplished by moving the index 55 into registry with the pointer 52 as indicated in Fig. 5 and in so doing the amplification ratio of the multiplying linkage will be automatically adjusted to existing ground temperature conditions.

Fig. 6 illustrates a still further modification of the ground temperature setting device illustrated in Figs. 4 and 5. In this modification the ground temperature setting device and the zero setting device for the altitude scale shown in connection with Fig. 1 is so combined as to be operated through the use of a single hand knob. To this end, the supporting clevis 22 is provided with a bevel gear 56 which meshes with a second bevel gear 57 rotatably mounted on a shaft 58. This shaft is journaled in the casing 10 at its outer end and is provided with a hand knob 59. The inner end of the shaft 58 is suitably journaled in a bracket arm 60 carried by the casing against which one end of a coil spring 61 is adapted to bear. An adjustable collar 62 is fitted upon the shaft 58 against which the other end of the spring 61 bears under compression. A pinion 63 is fixedly mounted on the shaft 58 adjacent its outer end which is positioned for meshing engagement with a gear 64. This gear is formed with a shoulder 65 which extends through and journals within an opening provided in the wall of the casing 10. A dial scale 66, corresponding with the dial scale 12 mentioned in connection with Fig. 1 is fixedly secured to the shoulder 65. The operation of this mechanism is as follows:

To adjust the amplifying linkage to any existing ground temperature condition the bevel gear 57 is moved into engagement with the gear 56. In so doing the pinion 63 moves inwardly out of meshing engagement with the gear 64. Consequent rotation of the hand knob 59 will move the index 55 into registry with the pointer 52 and the amplification ratio will be adjusted. When the hand knob 59 is released the shaft 58 is moved outwardly by action of the spring 61, the bevel gears 56 and 57 are disengaged, and the pinion 63 moves into meshing engagement with the gear 64. Consequent rotation of the hand knob 59 will adjust the dial scale 66 relative to its pointer without effecting the setting of the amplification linkage. By means of this construction a unitary structure is provided permitting the dial scale to be relatively moved with respect to its pointer and also permit the amplification linkage to be adjusted to any existing ground temperature condition by means of a single knob.

Many modifications and changes in detail will readily occur to those skilled in the art without departing from the spirit and scope of my invention, but having now set forth the objects and nature thereof and having shown and described a construction embodying the principles of my invention, what I claim as new, and useful and desire to secure by Letters Patent is:

1. An aircraft altimeter comprising, a pointer; a scale over which said pointer operates; a pressure responsive element; a motion amplifying linkage interconnecting said pressure responsive element and pointer for moving the latter angularly when said element responds to changes in atmospheric pressure; manually operable means for adjusting the amplification ratio of said linking in accordance with known ground temperature; and a temperature responsive device associated with said last-mentioned means, having a part freely exposable to the thermal effects of external free air and adapting said temperature responsive device to respond to the effects of temperature in a zone of air that is different from the temperature effects of the zone of air to which said pressure responsive element is subject to thereby effect an additional and automatic change in the amplification ratio of said linkage for each change in temperature to which said temperature responsive device is subject and obtain an indication of altitude thereby corrected.

2. In a measuring instrument as set forth in claim 1, said manually operable means including a link connection between said temperature responsive device and said motion amplifying linkage, and an adjustable supporting member for changing the position of said link connection to effect a simultaneous change in the position of said motion amplifying linkage and effect a change in its amplification ratio.

3. In a measuring instrument as set forth in claim 1, said manually adjustable means including a link connection between said temperature responsive device and said motion amplifying linkage, and an adjustable supporting member for changing the position of said link connection to effect a simultaneous change in the position of said motion amplifying linkage and effect a change in its amplification ratio, said supporting member being manually adjustable and being provided with a pointer operating over a scale calibrated in terms of ground temperature.

4. In a measuring instrument as set forth in claim 1, said temperature responsive device including a free air thermometer bulb of the distant type, and a Bourdon tube spring connected at its one end to said thermometer bulb and at its other end to said ground temperature adjusting means.

5. In a measuring instrument as set forth in claim 1, said temperature responsive device including a free air thermometer bulb of the distant type, a fixed support, a Bourdon tube spring adjustably mounted on said support, said Bourdon tube spring being yieldably connected to said thermometer bulb at its one end and having a pivotal connection at its other end with said ground temperature adjusting means.

6. In a measuring instrument as set forth in claim 1, said temperature responsive device including a free air thermometer bulb of the distant type, a fixed support, a Bourdon tube spring adjustably mounted on said support, said Bourdon tube spring being yieldably connected to said thermometer bulb at its one end and having a pivotal connection at its other end with said ground temperature adjusting means, and a manually operated member connected to said Bourdon tube spring for moving the same angularly and effect a micrometric adjustment of said ground temperature adjusting means for purposes of calibration.

7. In a measuring instrument as set forth in claim 1, said temperature responsive device including a free air thermometer bulb of the distant type, a fixed support, a Bourdon tube spring adjustably mounted on said support, said Bourdon tube spring being yieldably connected to said thermometer bulb at its one end and having a pivotal connection at its other end with said ground temperature adjusting means, and means for moving said Bourdon tube spring in adjustable positions with respect to said ground temperature adjusting means.

8. In a measuring instrument, a pointer, a scale over which said pointer is adapted to operate, a pressure responsive element, a motion amplifying linkage interconnecting said pressure responsive element and pointer for moving said pointer angularly when said element responds to changes in atmospheric pressure, temperature responsive means associated with said pressure responsive element for effecting an automatic change in the amplification ratio of said motion amplifying linkage for every change in temperature to which said temperature responsive means is subjected, said temperature responsive means including a mechanism for indicating ground temperature, and means associated with said mechanism for predeterminately adjusting the amplification ratio of said linkage in accordance with the temperature indicated by said temperature responsive means.

9. In a measuring instrument, a pointer, an adjustable scale over which said pointer is adapted to operate, a pressure responsive element, a motion amplifying linkage interconnecting said pressure responsive element and pointer for moving said pointer angularly when said element responds to changes in atmospheric pressure, temperature responsive means associated with said pressure responsive element for effecting an automatic change in the amplification ratio of said motion amplifying linkage for every change in temperature to which said temperature responsive means is subjected, said temperature responsive means including a mechanism for indicating ground temperature, and unitary means associated with said mechanism for predeterminately adjusting the amplification ratio of said linkage in accordance with the indicated temperature and for effecting an adjustment of said scale with respect to its pointer.

10. In a temperature corrected pressure change operated altimeter mechanism, a pointer, a scale over which said pointer operates, pressure-responsive means, having a local movable operator part and a cooperative distant actuator part subjectable to a distant atmosphere zone different from that to which said pressure responsive means is subjectable, and a system of pivotally connected links connecting said pointer to both said pressure and temperature responsive means respectively for transferring the independent movements of both said means into a corrected altitude change indicating movement of said pointer having the combined effects resulting from said independent movements.

11. In a temperature corrected pressure change operated altimeter mechanism, pressure responsive means and temperature responsive means operatively connected to said pressure responsive means, a localized casing for said mechanism, said pressure responsive means and at least a part of said temperature responsive means; said temperature responsive means having a cooperative part external to said casing and being adapted to respond to the temperature in an atmosphere that is different from the temperature effects of the atmosphere to which said indicating mechanism is subject for obtaining an indication of altitude by the combined effects of both said means.

12. An aircraft altimeter comprising an altitude indicator including a barometric air pressure mechanism; a thermo-motive mechanism, having a movable operator part and a temperature controlled actuator part; means for cooperatively connecting said air pressure mechanism and said operator part of said thermo-motive mechanism with said altitude indicator to indicate altitude by temperature corrected air pressure; and means for protecting said air pressure mechanism and said operator part and their means for connecting but leaving said actuator part free to respond to temperature changes of free air.

13. An aircraft altimeter apparatus comprising an altitude indicator and including a barometric air pressure mechanism; a thermo-motive mechanism having a movable operator part and an actuating part; a casing enclosing said barometric air pressure mechanism and said movable operator part of said thermo-motive mechanism and leaving said actuating part thermally exposed externally relatively to said altitude indicator and barometric air pressure mechanism so that it is subjected thermally to the influence of free air temperature variation different from the temperature at said barometric air pressure mechanism; and means for combining the operation of both said air pressure mechanism and said thermo-motive mechanism to operate said indicator to indicate altitude by temperature corrected atmospheric pressure.

14. The aircraft altimeter apparatus as characterized in claim 12 and further characterized by the fact that there is included a setting mechanism settable to accord with variations in temperature at the ground to vary the action of either or both of said first two mechanisms so that the indication of said altitude indicator shall have a predetermined relation to barometric air pressure and the mean value of ground temperature and free air temperature at the location of the aircraft.

15. An aircraft altimeter apparatus comprising an altitude indicator including a barometric air pressure mechanism; a thermo-motive mechanism, having a movable operator part and a temperature controlled actuator part; means for cooperatively connecting said air pressure mechanism and said operator part of said thermo-motive mechanism with said altitude indicator; means for protecting said air pressure mechanism and said operator part and their means for connecting but leaving said actuator part free to respond to temperature changes of free air; and a setting mechanism settable to accord with variations in temperature at the ground to vary the action of either or both of said first two mechanisms so that the indication of said altitude indicator shall have a predetermined relation to barometric air pressure and the mean value of ground temperature and free air temperature at the location of the aircraft and including a graduated reference means for indicating the ground temperature at which said mechanism has been set.

16. The altimeter apparatus as characterized in claim 15 and further characterized by the fact that said setting mechanism includes a manually operable part for effecting a setting in accordance with ground temperature.

17. The altimeter apparatus as characterized in claim 15 and further characterized by having indicating means operated by said operator part of said thermo-mechanism for indicating free air temperature.

18. The altimeter apparatus as characterized in claim 15 further characterized by having indicating means operated by said operator part of said thermo-mechanism for indicating free air temperature and that the means for indicating ground temperature at which a setting has been made and for indicating free air temperature are associated one with the other and have at least one common indicating element.

FRANCIS G. NESBITT.